ASYNCHRONOUS TO SYNCHRONOUS CONVERTER FOR USE IN DATA PROCESSING APPARATUS

Filed Feb. 17, 1959

INVENTOR:

Aaron P. Dornbusch,

BY Bair, Freeman & Molinare

ATTORNEYS.

United States Patent Office 3,103,649

Patented Sept. 10, 1963

3,103,649

ASYNCHRONOUS TO SYNCHRONOUS CONVERTER FOR USE IN DATA PROCESSING APPARATUS

Aaron P. Dornbusch, Waban, Mass., assignor to Minneapolis-Honeywell Regulator Company, Minneapolis, Minn., a corporation of Delaware Filed Feb. 17, 1959, Ser. No. 793,897
11 Claims. (Cl. 340—174)

Figure 1:
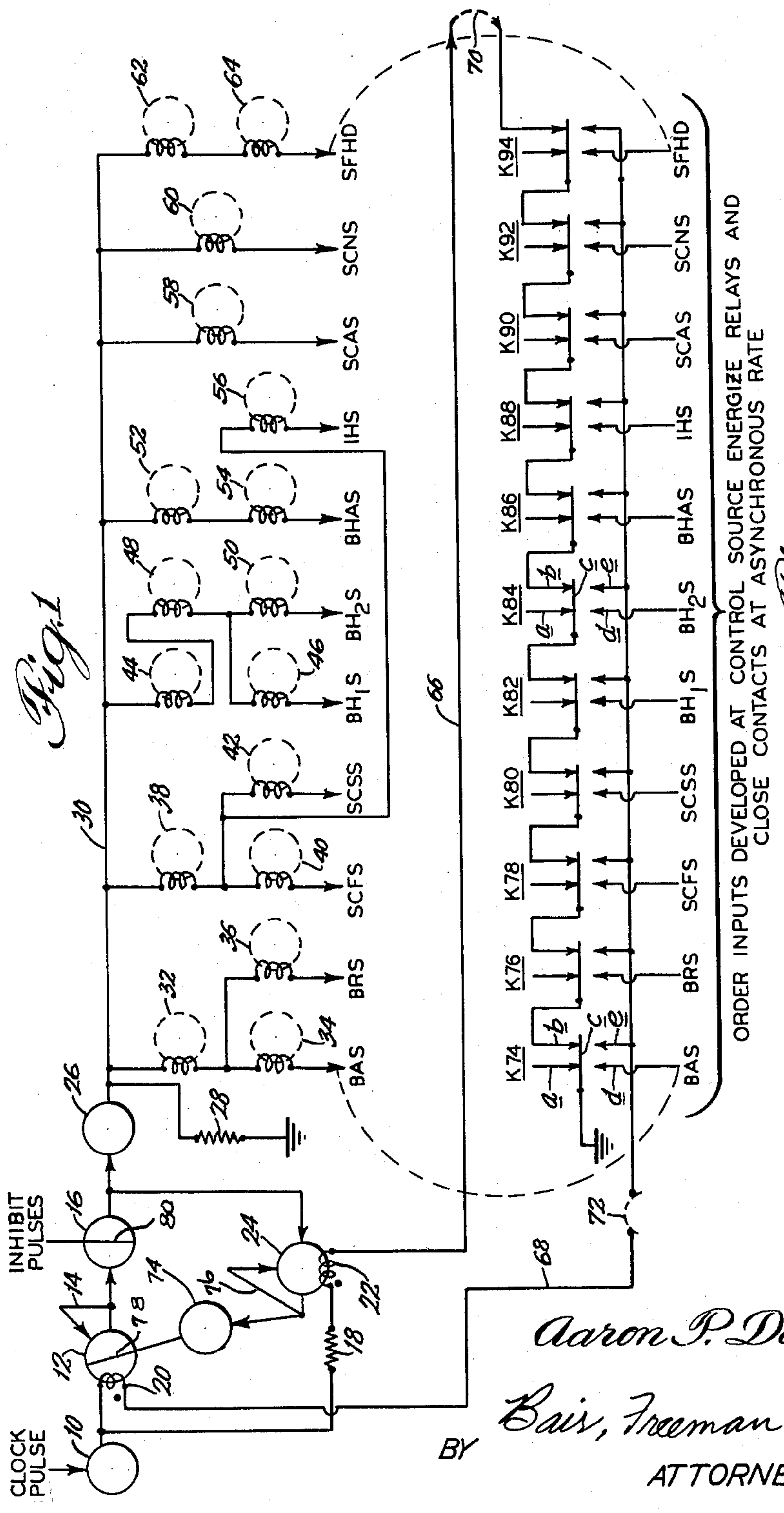

This invention relates generally to improvements in data processing apparatus, and more particularly to a new and improved asynchronous-to-synchronous converter for use in data processing apparatus.

Many types of data processing apparatus, such as digital computers, reservation systems, telemetering devices, and the like, are known in the art. In many applications, it has been found advantageous to utilize electronic data processing machines where the high speeds of operation inherent in such machines have permitted large quantities of data to be processed in a relatively short time and in an efficient and economical manner.

In many such high speed electronic data processing machines, it is convenient to control the operation and functions of the various component parts forming the data processor by a timing clock that provides an index which defines the plurality of pulse periods comprising the function cycles and which therefore, provides a common timing basis for the data processing operation. As the timing clock serves to supply a basic high frequency timing cycle used to produce timing pulses for the synchronizing of the various functions performed by the data processing apparatus, systems operating in this manner are often referred to as synchronous systems.

A frequently employed adjunct to such data processing machines is a control desk or console which serves as a means for communicating manually with the data processing machine, both for control purposes and for the purpose of monitoring and inserting information and control data into the data processor. The control desk advantageously is provided with a keyboard adapted to energize a plurality of keyboard relays so that the desired control data may be set up manually on the keyboard for communication with the data processor. With the occurence of the energization of any of the keyboard relays, and the subsequent closing of the contacts associated therewith, the data processor is adapted to receive a signal indicating that the desired control function is to take place. It further is necessary that this signal, which may occur any given time and which therefore is asynchronous in nature, be converted or modified to the synchronous clock rate of the data processor, and that the signal be distributed to the proper control circuit of the data processor for the implementation of the desired control function.

Accordingly, it is a general object of this invention to provide new and improved circuit means for converting asynchronous control signals to the synchronous rate of the utilization device to which the control signals are applied.

More specifically, it is an object of this invention to provide new and improved circuit means for converting the asynchronous control signals generated at a control desk to the synchronous clock rate of the data processor receiving the control signals.

It is another object of this invention to provide as asynchronous-to-synchronous converter, as described above, wherein a plurality of keyboard relays may be selectively energized in an asynchronous manner to uniquely control selected ones of a plurality of control devices operating in a synchronous manner in a data processor.

It is still another object of this invention to provide a new and improved asynchronous-to-synchronous converter, as described above, containing novel means for overcoming the problem of incomplete signal pulses that occurs when the contacts of an energized keyboard relay close at the same time that the clock pulse occurs in the data processor. Thus, it is an object of the invention to insure that one and only one pulse, of full size, is distributed to the proper control device in the data processor at a synchronous rate for each closing of the keyboard relay contacts.

In accordance with the invention, if an input pulse is weak, due to the coincidence between the synchronous clock rate and the closure of a keyboard relay contact, the invention operates to permit the weak input pulse to build up to full size before it is applied to the control device, and if it does not build up to full size, the weak pulse is dissipated and the subsequent input clock pulse which is guaranteed to be of full size is passed to the proper control device corresponding with the control function signaled from the keyboard.

It is a further object of this invention to provide such an asynchronous-to-synchronous converter, as described above, which is characterized by its simplicity, its efficiency and its high speed of operation.

Further objects and advantages of this invention will become apparent as the following description proceeds and the features of novelty which characterize the invention will be pointed out with particularity in the claims annexed to and forming a part of this specification.

Figure 2:
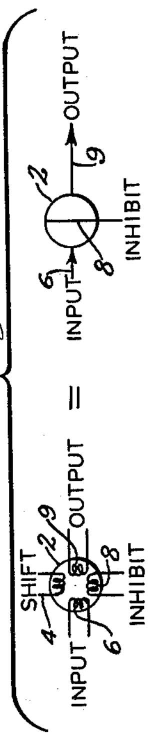

A preferred embodiment of the invention is shown in the accompanying drawing, in which:

FIGURE 1 is a schematic diagram of an illustrative asynchronous-to-synchronous converter circuit embodying the invention; and FIGURE 2 is a diagram explaining the symbols used in the circuit of FIGURE 1.

Referring now to the drawing, and more particularly to FIGURE 1 thereof, there is shown in schematic form an asynchronous-to-synchronous converter embodying the invention and suitable for use in high grade speed data processing apparatus. At the lower portion of FIGURE 1, there is shown a plurality of relay contact groups, each group being associated with a suitable relay such that energization and de-energization of the relay causes the armature contact to be moved into engagement with either the upper pair of contacts or the lower pair of contacts of each relay. Thus, the relay contacts K74, for example, are operatively associated with a suitable relay such that in the normally de-energized state of the relay, the relay armature K74*c* engages the relay contacts K74*a* and K74*b*, while energization of the relay causes the armature K74*c* to be pulled down into engagement with the contacts K74*d* and K74*e*.

For the purpose of illustrating the operation of the invention, it may be assumed that the groups of relay contacts are located with their associated relays at some remote control source, as for example, a control desk or console of the data processing machine, and that the selective operation of the control desk keyboard serves to energize the relay associated with the actuated key of the keyboard for effecting relay contact operation in the manner described above.

At the upper portion of the FIGURE 1 circuit, there is shown an input control circuit and a plurality of control devices forming an order register. In accordance with the invention, the actuation of any one group of relay contacts, resulting from a selective keyboard operation, causes one of the control devices in the order register to be operated for causing the data processor to effect the operation called for by the keyboard.

As stated heretofore, the data processor advantageously is operated at a synchronous rate in accordance with the timing signals supplied by a master timing clock, and accordingly, the control devices of the order register are adapted to be operated at this synchronous rate. As the control data generally is inserted at the keyboard at an asynchronous rate—in accordance with the keyboard operation by an operator or by some associated automatic control equipment—it can be seen that the asynchronous control signals generated by the relay contacts must be converted to the data processor synchronous rate, and in addition must be distributed to the proper control device in the order register corresponding to the actuated key of the keyboard.

Advantageously, the control devices in the order register, and in the input circuit of the order register, may take the form of magnetic cores of the type having rectangular hysteresis loops with a large residual flux characteristic. As well known in the art, such magnetic cores are bi-stable, i.e., with two stable states of operation, and may be provided with enabling, inhibit, shift, and output conductors to effect a digital data processing function.

Conveniently, the bi-stable elements shown in FIGURE 1 may be of the magnetic core type disclosed in the co-pending application of E. M. Ziolkowski, Serial No. 645,839, filed March 13, 1957, now Patent No. 2,981,934. As illustrated in FIGURE 2 of the drawing, each magnetic core 2 has wound thereon a pair of input windings 6 and 8, an output winding 9, and a shift winding 4. In the illustrative embodiment of the present invention, as described herein, input winding 6 serves as an enabling winding and input winding 8 serves as the inhibit winding. Those skilled in the art will readily appreciate that the need for an inhibit winding is not present on all of the magnetic cores.

Returning now to FIGURE 1, each group of relay contacts is representative of an item of control data initiated at the control keyboard to be applied to the data processor. For purposes of illustration, the following control items are shown as associated with each group of relay contacts.

| Relay contacts: | Control order item |
|---|---|
| K74 | BAS—block advance (start). |
| K76 | BRS—block retreat (start). |
| K78 | SCFS—store first character (start). |
| K80 | SCSS—store second character (start). |
| K82 | $BH_1S$—search on first word (start). |
| K84 | $BH_2S$—search on second word (start). |
| K86 | BHAS—search on second word, advance only (start). |
| K88 | IHS—item search (start). |
| K90 | SCAS—shift 6 bit digit (start). |
| K92 | SCNS—shift 4 bit digit (start). |
| K94 | SFHD—shift to first interlace half. |

The keyboard at the control source advantageously contains a key which controls certain code-operated relays corresponding to each of the control orders tabulated above. As each code is sensed, an associated relay is energized to cause its armature contact to move out of engagement with the relay contacts *a* and *b* and into engagement with the contacts *d* and *e*. The exemplary control order inputs tabulated above are of the type which advantageously, may be used in controlling the reading of a magnetic tape having a plurality of data blocks recorded thereon in an alternately interlaced pattern, each block containing a plurality of words comprised of groups of binary digits or bits. A suitable data processing apparatus utilizing magnetic tape arrangements of this type is disclosed, for example, in the co-pending application of Henry W. Shrimpf, Serial No. 636,256, filed January 25, 1957.

As shown in FIGURE 1, the armature *c* of K74 relay contact group is connected to ground, and in the de-energized condition of its associated relay, is in engagement with the K74*b* relay contact, and, in turn, is connected to the armature *c* of K76 contact group. When all of the relay contacts are in their de-energized state, a circuit is made from ground through the *c* and *b* contacts of each relay to an output conductor 66. The relay contact *e* of each group of contacts is connected to a common output conductor 68. As the relay contacts K74 to K94 may be located at the control desk, and therefore remote from the data processor, the output conductor 66 is shown as connected to the relay contacts through connector line 70, and the output conductor 68 is shown as connected to the relay contacts *e* through a connector line 72.

The order register comprises one or more magnetic cores for each of the control orders developed at the control source to the end that the energization of these magnetic cores, from their unset to their set condition, serves to effect the implementation of the order by the data processor. As shown in FIGURE 1, the *d* contact of each relay contact group is connected to the input or enabling winding of a different magnetic core in the order register. Thus, the *d* contact of the K74 relay contact group is connected to the enabling winding of magnetic core 34, the *d* contact of the K76 relay contact group is connected to the enabling winding of magnetic core 36, and *d* contact of relay contact group K78 is connected to the enabling winding of magnetic core 40, the *d* contact of the relay contact group K80 is connected to the enabling winding of the magnetic core 42, the *d* contact of the relay contact group K82 is connected to the enabling winding of the magnetic core 46, the *d* contact of the relay contact group K84 is connected to the enabling winding of magnetic core 50, the *d* contact of the relay contact group K86 is connected to the enabling winding of magnetic core 54, the *d* contact of the relay contact group K88 is connected to the enabling winding of the magnetic core 56, the *d* contact of the relay contact group K90 is connected to the enabling winding of the magnetic core 58, the *d* contact of the relay contact group K92 is connected to the enabling winding of magnetic core 60, and the *d* contact of the relay contact group K94 is connected to the enabling winding of the magnetic core 64.

It sometimes is necessary to the proper implementation of a particular control order developed at the control source that more than one magnetic core of the order register be set. To this end, it can be seen that the enabling winding of magnetic core 32 is connected in series with the enabling windings of either of the magnetic cores 34 or 36, and therefore, magnetic core 32 is set whenever either of the magnetic cores 34 or 36 is set. Similarly, the enabling winding of magnetic core 38 is connected in series with the enabling windings of magnetic cores 40, 42 and 56, and is set whenever any of the latter cores is set. The enabling windings of magnetic cores 44 and 48 are connected in series with the enabling windings of magnetic cores 46, and 50, and therefore, magnetic cores 44 and 48 are set whenever either one of the magnetic cores 46 or 50 is set. The enabling winding of magnetic core 52 is connected in series with enabling winding of magnetic core 54, and thus these cores are adapted to be set or unset together. Further, it can be seen that the enabling winding of magnetic cores 62 is connected in series with enabling winding of magnetic core 64, and therefore, these cores are adapted to be set or unset together.

The magnetic cores of the order register are shown in dotted form since the remaining windings of these cores which effect the control function developed at the control keyboard are not necessary to an understanding of the invention and therefore are not shown in the drawing. Manifestly, those skilled in the art will readily appreciate that suitable output windings and other control windings may be provided for the cores of the order register to control any suitable utilization devices to carry out the control orders.

The input control circuit connected between the relay contacts and the order register operates to insure that a control order signal developed at the control source at an asynchronous rate is applied to the order register magnetic cores at a synchronous rate and further, that the distribution of the control signal is such that the proper magnetic core or cores are set in response to any given control order input signal. The magnetic core 10 receives synchronously timed clock pulses from the master timing clock of the data processor on its input winding. The output of magnetic core 10 is connected through the enabling winding 20 of magnetic core 12 to the conductor 68, or through the resistance element 18 and the inhibit winding 22 of magnetic core 24 to the conductor 66. The output winding of the magnetic core 12 is connected to the input of the magnetic core 16, and through a feedback connection 14 to an input winding of magnetic core 12. Magnetic core 16 has an inhibit winding 80 connected to a source of inhibit pulses and the output winding of magnetic core 16 is connected to the input of magnetic core 26 and to the input of the magnetic core 24.

The output winding of magnetic core 24 is connected to the input of core 74 and through a feedback connection 76 to an input winding of a magnetic core 24. The output of magnetic core 74 is connected to an inhibit winding 78 of magnetic core 12. The output winding of magnetic core 26 is connected to the common conductor 30 to which the enabling windings of magnetic cores 32, 38, 44, 52, 58, 60 and 62 are connected in parallel. A resistance element 28 also is connected to the common conductor 30 at the output of the magnetic core 26.

In illustrating the operation of the invention, it will be assumed that the timing clock supplying the clock pulses to the input winding of magnetic core 10 operates with a cyclic rate of 106 pulse periods to each cycle. It further will be assumed that the clock pulse P91 is applied to the input winding of magnetic core 10 during each cycle of operation and that all of the clock pulses with the exception of the P91 clock pulse (which may be written as $\overline{91}$) are applied to the inhibit winding of the magnetic core 16.

It can be seen that only at P91 time will it be possible to pass a control signal through magnetic core 16, and as this control signal arrives at magnetic core 26 at the P92 pulse period, the control signal is applied to the common line 30 for setting a desired one or more cores during the pulse period P93.

As explained in detail hereinbelow, it is a feature of this invention that the control signal in accordance with the order input developed at the control source is applied to the proper magnetic core or cores of the order register only during the P93 pulse period of each cycle of the data processor regardless of the time during which this order input was developed at the control source. Those skilled in the art will understand that the order input may be developed at the control source at any time in response to the keyboard actuation and for purposes of illustration, let us assume that the BAS key of the keyboard is actuated and that K74 relay contacts are operated at time P50, said keyboard actuation signifying that a block advance is to be made on the magnetic tape by the data processor. Keyboard operation and actuation of K74 contacts for the BAS order at time P50 serves to move the armature contact K74*c* into engagement with the K74*d* and K74*e* contacts. This grounds the enabling windings of magnetic cores 34 and 32 in the order register, and also grounds output conductor 68, which in turn places ground on the enabling winding 20 of magnetic core 12. In addition, movement of the K74*c* armature removes ground from the output conductor 66 so that the magnetic core 24 will no longer be inhibited by each P91 clock pulse applied to the magnetic core 10 and subsequently applied to the magnetic core 24 at the time P92.

When the next P91 clock pulse arrives at the input of magnetic core 10, and is applied to the input winding 20 of magnetic core 12 at time P92, magnetic core 12 will be switched from its unset to its set state due to the grounding of the input winding 20 through the output conductor 68 and the K74*e* contact. At the next pulse period, P93, magnetic core 12 applies a signal pulse to the input winding of magnetic core 16, but as magnetic core 16 is inhibited during all pulse periods except P91, this signal will not be effective to set magnetic core 16. However, the output signal of magnetic core 12 at the time P92 is applied through the feedback conductor 14 to an input winding of magnetic core 12, and therefore, the signal continues to re-circulate around this feedback loop, provided, of course, that an inhibit signal is not applied to the inhibit winding 78. At the next P91 time period, there is no inhibit input at the magnetic core 16 and the output signal of magnetic core 12 is effective to set magnetic core 16. At time P92, this signal arrives at the inputs of magnetic core 26 and magnetic core 24.

At the next pulse period, P93, the control signal is applied from the output of magnetic core 26 to the order register common conductor 30 and since magnetic core 34 is the only magnetic core in the order register which has its enabling winding connected to ground—through the K74*d* contact—only the magnetic cores 32 and 34 will be switched to their set states. This setting of the magnetic cores 32 and 34 at time P93 serves to control the proper utilization circuitry for implementing the block advance order, which utilization circuitry may take the form of that shown in the above-identified Shrimpf application, for example.

As stated above, the control signal from magnetic core 16 at time P92 is also applied to the input of magnetic core 24. This control signal is applied from the output of magnetic core 24 to magnetic core 74, and therethrough to the inhibit winding 78 of magnetic core 12 to prevent any further control signals at time P92 of subsequent cycles from passing through the magnetic core 12. The signal is recirculated through magnetic core 24 by the feedback connection 76, and thus it can be seen that for each order input, one and only one control signal is applied to the order register conductor 30—and that this single signal is present on conductor 30 only at the time P93 to set the proper magnetic cores of the register.

The above-described operation of the circuit is not changed until such time when the K74 contacts are released by the de-energization of their associated relay. Manifestly, this may be done in any suitable manner in response to the release of the BAS key at the control keyboard. Upon release of the K74 contacts, the armature K74*c* moves from the contacts K74*d* and K74*e* and into engagement with the contacts K74*a* and K74*b*. This removes the ground connection from the enabling winding of the magnetic core 34, and once again connects the inhibit winding 22 of the magnetic core 24 to ground. Accordingly, the next P91 clock pulse applied to the input of the magnetic core 10 results in the subsequent inhibiting of the magnetic core 24 and all of the magnetic cores in the order register and the input circuit may be cleared to their original unset condition.

In the operation of this circuit shown in FIGURE 1, it sometimes may happen that the contacts of one of the order input relays are closed during the P91 input pulse period. In this event, it is possible that the input signal pulse to magnetic core 12 will be a weak one, i.e., it will not be fully built-up with the result that utilization of this less-than-complete input signal may cause erroneous operation of the data processor. It is a feature of this invention that such erroneous operation due to incomplete input signals is avoided as the circuit waits for the weak input signal to either build up to its full value or to be removed completely, in which case the next subsequent complete input signal is substituted therefor to insure proper operation of the control register.

Such partial pulses are eliminated by the operation of the input control circuit to the order register. Thus, if a contact closure occurs during the P91 pulse period, the partial or incomplete pulse applied to magnetic core 12 will either build-up to its full value during the remainder of the 106 pulse period cycle—i.e., until the next P91 timing pulse—or such pulse will be completely dissipated in the magnetic core 12 as this input pulse is recirculated therein for the remaining pulse periods of the cycle by means of the feedback connection 14. If the pulse builds up, then a full value signal is passed through the magnetic core 16 during the next P91 pulse period, when the core 16 is not being inhibited by its inhibit winding 80. In this event, the circuit operates in exactly the same manner described above. If, however, the partial pulse at magnetic core 12 is sufficiently weak that it cannot build up to its full value during a complete pulse period cycle, its recirculation through magnetic core 12 for such a period of time will cause the weak pulse to be dissipated before the next P91 pulse period. In this event, the next P91 pulse applied to the magnetic core 10 will be applied to the input of the magnetic core 12 at full strength and will operate the circuit in the manner described above.

In either case, a full size signal pulse at the output of the magnetic core 16 will be passed through the magnetic cores 24 and 74 to inhibit the magnetic core 12 before the next P91 pulse period, thereby insuring that one and only one full size signal pulse is present at the order register conductor 30 at time P93 for any relay contact closure.

It will be understood by those skilled in the art that modifications may be made in the construction and arrangement of the specific illustrative embodiment of the asynchronous-to-synchronous converter described above without departing from the real spirit and purpose of the invention, and that it is intended to cover by the appended claims any modified forms of structure, circuits or use of equivalents which reasonably may be included within their scope. The specific uses of the asynchronous-to-synchronous converter illustrated in the application, and the time periods and modes of operation described to illustrate the operation of the particular embodiment disclosed herein, are merely exemplary in nature, and it will be appreciated that the invention is not limited in any manner to this illustrative mode of operation but that the invention may be used with equally advantageous results in many other types of data processing apparatus.

What is claimed as the invention is:

1. The improvement of control apparatus for converting asynchronous control data to synchronous form for use in a synchronously operated data processing machine comprising an input circuit having a plurality of selectively actuatable relay contacts respectively corresponding to a plurality of control functions for the data processing machine, said relay contacts being adapted to be actuated at an asynchronous rate, a synchronously operated register circuit including a plurality of bistable devices, each having a set state and an unset state, at least one of said bistable devices corresponding to each of said control functions and being adapted to be switched from its unset to set state at a synchronous rate to initiate a control function in response to the actuation of its related relay contacts in said input portion, and a control circuit connected to said input circuit and said register circuit including a source of synchronously timed clock pulses, a pulse generator having an input connected to said source and to said relay contacts such that the actuation of selected ones of said contacts causes said pulse generator to produce a succession of control signals, gating means connected to the output of said pulse generator for blocking all control signals except the control signal occurring at the synchronous clock rate and for transmitting this synchronous control signal to the register for setting selected ones of said bistable devices, and feedback circuit means connected between the output of said gating means and said pulse generator for blocking the latter after a control signal has been applied to the register whereby only one synchronous control signal is applied to said register for setting the bistable devices to initiate a desired control function in response to each selective actuation of the relay contacts corresponding to said desired control function.

2. The improvement of control apparatus in accordance with claim 1 wherein said bistable devices comprise magnetic cores having substantially rectangular hysteresis loop characteristics.

3. The improvement of control apparatus for converting asynchronous control data to synchronous form comprising an input circuit having a plurality of groups of selectively actuatable relay contacts adapted to be actuated at an asynchronous rate, a synchronously operated register circuit including a plurality of two state devices, each adapted to be switched from one state to another at a synchronous rate to initiate a control function in response to the actuation of a related group of said relay contacts, and a control circuit connected to said input circuit and said register circuit including a source of synchronously timed clock pulses, a pulse generator having an input connected to said source and to said relay contacts such that the actuation of selected groups of said contacts causes said pulse generator to produce a succession of control signals, gating means connected to the output of said pulse generator for blocking all of said control signals except the control signal occurring at a designated pulse period of the synchronous clock rate and for transmitting this synchronous control signal to the register for switching selected ones of said bistable devices, and feedback circuit means connected between the output of said gating means and said pulse generator for blocking the latter after a control signal has been applied to the register whereby only one control signal is applied to said register for switching the desired two state devices to initiate a control function in response to each selective actuation of the relay contacts corresponding to the desired control function.

4. The improvement of control apparatus for converting asynchronous control data to synchronous form comprising an input circuit having a plurality of groups selectively actuatable relay contacts adapted to be actuated at an asynchronous rate, a synchronously operated register circuit including a plurality of two state devices, each adapted to be switched from one state to the other at a synchronous rate to initiate a control function in response to the actuation of a related group relay contacts in said input portion, and a control circuit connected to said input circuit and said register circuit including a source of synchronously timed clock pulses, a pulse generator having an input connected to said source and to said relay contacts such that the actuation of selected group of said contacts causes said pulse generator to produce a succession of control signals, and means connected to the output of said pulse generator for blocking all of said control signals except a control signal occurring at a designated pulse period of the synchronous clock rate and for transmitting only one synchronous control signal to said register for setting the desired two state devices to initiate a control function in response to each selective actuation of the relay contacts corresponding to the desired control function.

5. The improvement of control apparatus for converting asynchronous control data to synchronous form comprising an input circuit having a first plurality of selectively actuatable two state devices respectively corresponding to a plurality of control functions, and adapted to be actuated at an asynchronous rate, a synchronously operated register circuit including a second plurality of two state devices, respectively, corresponding to each of said control functions and adapted to be switched from one state to the other state at a synchronous rate to initiate a control function in response to the actuation of a related two state device in said input portion, and a control circuit connected to said input circuit and said register circuit including a source of synchronously timed clock pulses, a pulse generator having an input connected to said source and to said first plurality of two state devices such that the actuation of selected ones of said first plurality of two state devices causes said pulse generator to produce a succession of control signals, and means connected to the output of said pulse generator for blocking all of said control signals except a control signal occurring at a designated pulse period of the synchronous clock rate and for transmitting only one such synchronous control signal to the register for setting selected ones of said second plurality of two state bistable devices to initiate a control function in response to each selective actuation of the device in said first plurality of two state devices corresponding to the desired control function.

6. An asynchronous-to-synchronous converter for a synchronously operated data processing machine comprising an input circuit having a plurality of relay contacts adapted to be selectively actuated at an asynchronous rate, a synchronously operated register circuit including a plurality of bistable devices adapted to be selectively conditioned for operation by the actuation of associated ones of said relay contacts, and means for operating the conditional ones of said bistable devices by a synchronous control signal, said means comprising a control circuit connected to said input circuit and said register circuit including a source of synchronously timed control signals, and gating means connected to the output of said source for blocking all of said control signals except a control signal occurring at a designated synchronous pulse period and for transmitting this synchronous control signal to the register for operating conditioned ones of said bistable devices.

7. An asynchronous-to-synchronous converter for a synchronously operated data processing machine comprising an input circuit having a plurality of relay contacts respectively corresponding to a plurality of control functions for the data processing machine, and adapted to be selectively actuated at an asynchronous rate, a synchronously operated register circuit including a plurality of bistable devices adapted to be selectively conditioned for operation by the actuation of associated ones of said relay contacts, and means for operating the conditioned ones of said bistable devices by a synchronous control signal, said means comprising a control circuit connected to said input circuit and said register circuit including a pulse generator to produce a succession of synchronously timed control signals in response to the asynchronous actuation of said relay contacts, gating means connected to the output of said pulse generator for blocking all of said control signals except a control signal occurring at a designated synchronous pulse period and for transmitting this synchronous control signal to the register for operating the conditioned ones of said bistable devices, and feedback circuit means connected between the output of said gating means and said pulse generator for blocking the latter after said synchronous control signal has been applied to the register whereby only one control signal is applied to said register for operating the conditioned bistable devices to initiate a control function in response to each selective actuation of the relay contacts corresponding to the desired control function.

8. An asynchronous-to-synchronous converter in accordance with claim 7 wherein each of said bistable devices comprises a magnetic core having a substantially rectangular hysteresis loop characteristic.

9. An asynchronous-to-synchronous converter for a synchronously operated data processing machine comprising an input circuit having a plurality of relay contacts adapted to be selectively actuated at an asynchronous rate, a synchronously operated register circuit including a plurality of bistable devices, adapted to be selectively conditioned for operation by the actuation of associated ones of said relay contacts, and means for operating the conditioned ones of said bistable devices by a full size synchronous control signal, said means comprising a control circuit connected to said input circuit and said register circuit including a source of synchronously timed control signals, and gating means connected to the output of said source for blocking all of said control signals which are not full size and which do not occur at a designated pulse period of the synchronous clock rate and for transmitting this full size synchronous control signal to the register for operating conditioned ones of said bistable devices, whereby only one full size control signal is applied to said register for operating the conditioned bistable devices to initiate a control function in response to each selective actuation of the relay contacts corresponding to the desired control function.

10. The improvement of control apparatus for converting asynchronous control data to synchronous form for use in a synchronously operated data processing machine comprising an input circuit having a plurality of selectively actuatable relay contacts respectively corresponding to a plurality of control functions for the data processing machine, said relay contacts being adapted to be actuated at an asynchronous rate, a synchronously operated register circuit including a plurality of bistable devices, adapted to be selectively conditioned for operation by the actuation of associated ones of said relay contacts, and means for operating the conditioned ones of said bistable devices by a single, full size synchronous control signal for each actuation of the relay contacts in said input portion, said means comprising a control circuit connected to said input circuit and said register circuit including a source of synchronously timed clock pulses, a pulse generator having an input connected to said source and to said relay contacts such that actuation of selected ones of said contacts causes said pulse generator to produce a succession of synchronous control signals, gating means connected to the output of said pulse generator for permitting only the first full size control signal to occur during a designated pulse period to be transmitted to the register for operating the conditioned ones of said bistable devices, and feedback circuit means connected between the output of said gating means and said pulse generator for blocking the latter after said first full size control signal has been transmitted to the register whereby only one such control signal is utilized for operating the conditioned bistable devices to initiate a control function in response to each selective actuation of the relay contacts corresponding to the desired control function.

11. A pulse discriminator for use in a pulse data processing apparatus comprising a bistable device having two stable states of operation, input means coupled to said bistable device for receiving input pulses to switch said bistable device from one stable state to the other, output means coupled to said bistable device for providing an output pulse whenever the bistable device is switched from one stable state to the other, a utilization circuit connected to said output means for receiving output pulses therefrom, feedback means connected to receive output pulses from said output means and to feed back said output pulses to said bistable device for repetitive recirculation through a feedback circuit comprising said output means, said feedback means and said bistable device, a cyclically operated source of pulses connected to said input means for applying a single pulse in each cycle to said bistable device, whereby a single weak pulse applied to said input means either builds up to full size during said repetitive recirculation or is dissipated before the next following cycle to enable said bistable device to deliver either no pulse or a complete and full size pulse to said utilization circuit after each cycle of operation, inhibit means for blocking switching of said bistable device by said input pulses, and circuit means connecting said inhibit means between said utilization circuit and said bistable device for enabling said inhibit means to prevent further input pulses from switching said bistable device upon the receipt of a full size pulse by said utilization circuit from said bistable device.

References Cited in the file of this patent

UNITED STATES PATENTS

| | | |
|---|---|---|
| 2,734,184 | Rajchman | Feb. 7, 1956 |
| 2,852,699 | Ruhman | Sept. 16, 1958 |
| 2,910,674 | Wittenberg | Oct. 27, 1959 |
| 2,983,905 | Buser | May 9, 1961 |